United States Patent

[11] 3,562,612

| [72] | Inventor | William A. Munson |
|---|---|---|
| | | Williamsville, N.Y. |
| [21] | Appl. No. | 769,262 |
| [22] | Filed | Oct. 21, 1968 |
| [45] | Patented | Feb. 9, 1971 |
| [73] | Assignee | Westinghouse Electric Corporation |
| | | Pittsburgh, Pa. |
| | | a corporation of Pennsylvania |

[54] THYRISTOR POWERED REVERSIBLE DUAL MOTOR DRIVE WITH VOLTAGE AND CURRENT FEEDBACK
6 Claims, 2 Drawing Figs.

| [52] | U.S. Cl. | 318/106, |
| | | 318/45, 318/98 |
| [51] | Int. Cl. | H02p 1/58 |
| [50] | Field of Search | 318/45, 51, |
| | | 55, 105, 106, 332; 321/27 |

[56] References Cited
UNITED STATES PATENTS

| 1,802,184 | 4/1931 | Pollock | 318/105 |
|---|---|---|---|
| 2,009,576 | 7/1935 | Coates | 318/105 |
| 3,284,688 | 11/1966 | Black | 318/332 |
| 3,391,327 | 6/1968 | Pelly | 321/27 |
| 3,407,348 | 10/1968 | Lawrence | 321/27 |
| 3,419,771 | 12/1968 | Bentley | 318/6 |

Primary Examiner—Oris L. Rader
Assistant Examiner—Alfred G. Collins
Attorneys—F. H. Henson, R. G. Brodahl and M. F. Oglo

ABSTRACT: Described is a thyristor power system for a pair of motors which drive a common shaft. Two power supplies, a motor controller, and an internal system of feedback networks are so arranged that the motors are automatically regulated to provide substantially equal load division. The arrangements also features adaptability of interconnection of two motors and two power supplies, in various mode to accommodate emergency loss of a one motor or one power supply, or to accommodate special cases of loading.

PATENTED FEB 9 1971   3,562,612

INVENTOR
William A. Munson
BY Michael F. Oglo
ATTORNEY

THYRISTOR POWERED REVERSIBLE DUAL MOTOR DRIVE WITH VOLTAGE AND CURRENT FEEDBACK

BACKGROUND OF THE INVENTION

There are applications for reversible electrical motor drives wherein two separate motors drive a large main gear through pinion gears. One such application, for example, is a motor drive for skip cars which are used to charge materials into a blast furnace. In order to prevent excessive wear on the gear teeth, it is necessary to maintain the torque output of the motors equal, or substantially equal.

In the past, a gear arrangement of the type described above was driven by two direct current motors powered by a pair of generators in a sandwich-type series type of circuit. The sandwich-series type circuit allows reversal of drive direction without reversing the motor-generator. However, the control response of motor generator set power sources leaves something to be desired in skip car drive system. Faster responses are particularly desired when a car is at the top of a blast furnace where the car is to be "tipped" over to unload its charge, and subsequently "righted". This can best be done by controlling car accelerations with a fast response motor control system. Fast response motor control is only possible with a fast response armature current supply. This is simply not possible with the motor-generator set prior art, which is sluggish in response.

Also, only two possible modes of operation are possible with the sandwich-series type of circuit. Both motors and both generators can be operated in series, or a single motor and a single generator can be used. No other combination is possible; and for this reason a generator-driven sandwich-series circuit is somewhat limited in versatility. Particularly, if one motor generator set should become defective, considerable time is involved in replacing or repairing it, resulting in a reduction in the capacity of the blast furnace or other device over a relatively long period of time. In some instances it is desirable to vary the mode of operation to accommodate different service conditions, in accordance with the well known principles of parallel and series connection of power sources.

SUMMARY OF THE INVENTION

As an overall object, the present invention seeks to provide a system for powering dual direct current motors, which system overcomes the disadvantages of prior art systems employing multiple motor generator sets for supplying power.

More specifically, an object of the invention is to provide a means for powering dual motors by means of a pair of thyristor power supplies in a manner yielding fast response in speed control and adaptable to afford greater flexibility in connecting the power supplies to the motors.

In accordance with the invention, two direct current drive motors are provided with two symmetrically reversible thyristor power supplies, together with switch means for connecting either motor to either thyristor power supply, both motors to either power supply, or either motor to both power supplies in parallel. A single regulator is used for both motors, including a voltage controller responsive to a first internal system feedback signal consisting of the voltage output of one thyristor power supply. Current sensors are operatively connected in the individual armature circuits of the motor providing a voltage signal in accordance with the respective armature current. The voltage signals from these two sensors are combined by a summer-limiter circuit which sums the voltage signals over a range between predetermined lower and upper limits corresponding to desired lower and upper limits of armature currents. The voltage output from the summer-limiter constitutes a second internal feedback signal to which the voltage controller is responsive. The output of the single voltage controller is then utilized to control the firing circuits for both thyristor power supplies. As will be seen, this affords faster response and versatility in the operation of the dual motor system.

The above and other objects and features of the invention will become apparent from the following detailed description taken in connection with the accompanying drawings which form a part of this specification, and in which:

DESCRIPTION OF THE PREFERRED EMBODIMENT

Figure 1:
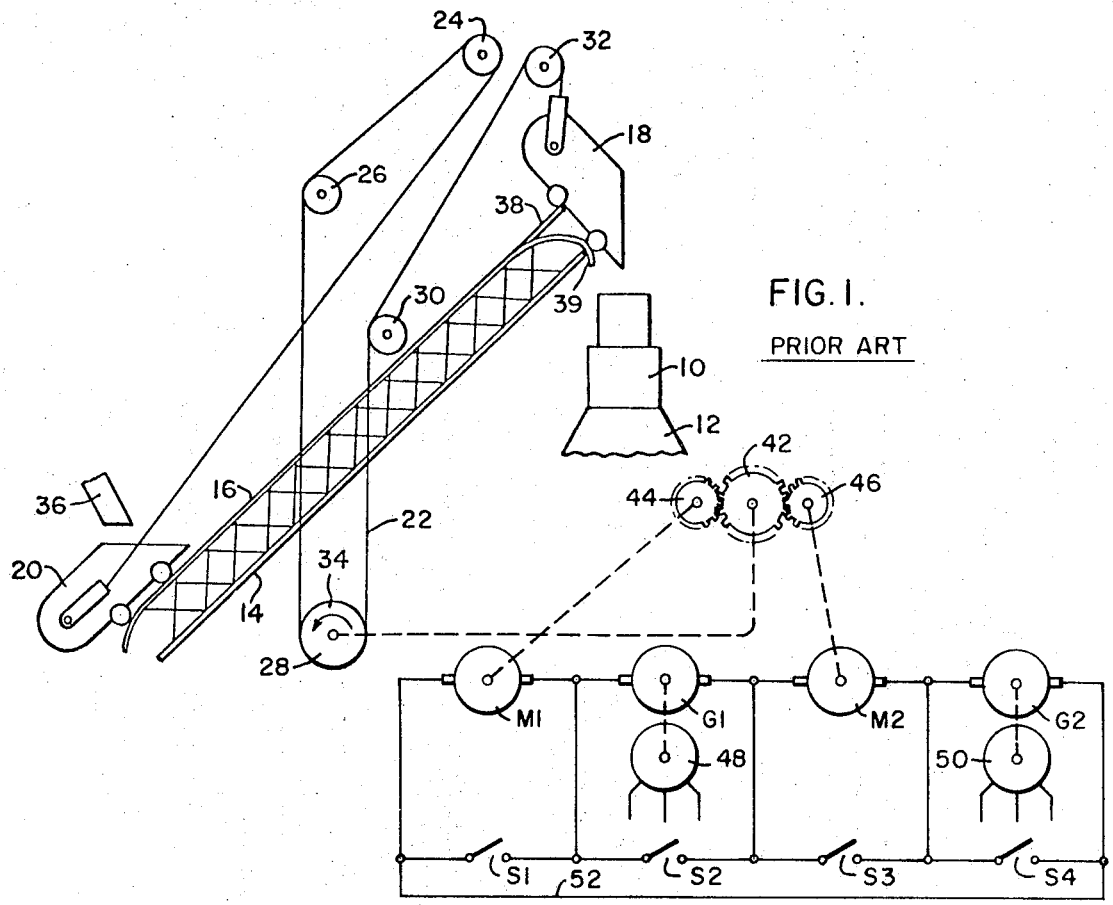
FIG. 1 is a schematic illustration of a prior art motor-generator sandwich-type circuit as applied to a drive system for blast furnace skip cars.

With reference now to the drawings, and particularly to FIG. 1, the reference numeral 10 designates the receiving hopper of a blast furnace, schematically illustrated at 12. Extending upwardly from ground level to the top of the blast furnace 12 is a skip bridge 14 comprising two pair of side-by-side tracks 16 on which skip cars 18 and 20, respectively, move. The two cars 18 and 20 are interconnected by means of a cable 22 which extends from skip car 20 around sheaves 24 and 26 and thence to winch drum 28 around which it is wound a number of times. From winch drum 28, the cable 22 passes around sheaves 30 and 32 and thence to skip car 18. This cable arrangement is well known to persons skilled in this art.

Upon rotation of the drum 28 in the direction of arrow 34, for example, the skip car 20 will be caused to move up its track, while the skip car 18 is permitted to move downwardly on the adjacent track. At the bottom of the skip bridge 14, materials to be charged into the blast furnace are fed into skip car 20, for example, from chute 36. When the skip car reaches the top of the skip bridge 14, its rear wheels are caused to move along track section 38 and its forward wheels along curved track section 39, thereby tipping the skip car to discharge its contents into the receiving hopper 10 of the blast furnace 12. The skip car system of FIG. 1, of course, is only one type of well known drive with which the present invention may be utilized.

The winch drum 28 is connected through mechanical linkage 40 to a large central gear 42 which meshes with two pinion gears 44 and 46. The pinion gears 44 and 46, in turn, are driven by means of two drive motors M1 and M2. The motors, M1 and M2 are connected in a series-sandwich circuit arrangement with two generators G1 and G2, the generators being driven by means of conventional three-phase alternating current motors 48 and 50. Connected in shunt across each of the motors M1 and M2, and each of the generators G1 and G2, are switches S1-S4; while the series combination of these switches is shunted by means of conductor 52.

With the prior art arrangement shown in FIG. 1, both motors and both generators may be employed, or either motor may be employed with either generator. Thus, if it is desired to use both generators and both motors, all of the switches S1—S4 will be open. Let us assume, however, that it is necessary to take motor M2 out of service. Under these circumstances, switch S3 would be closed and either switch S2 or S4. That is, only one generator can be used with one motor since otherwise the voltage across the motor would be doubled. It can be seen therefore, that the prior art circuit of FIG. 1 lacks any substantial versatility.

Figure 2:
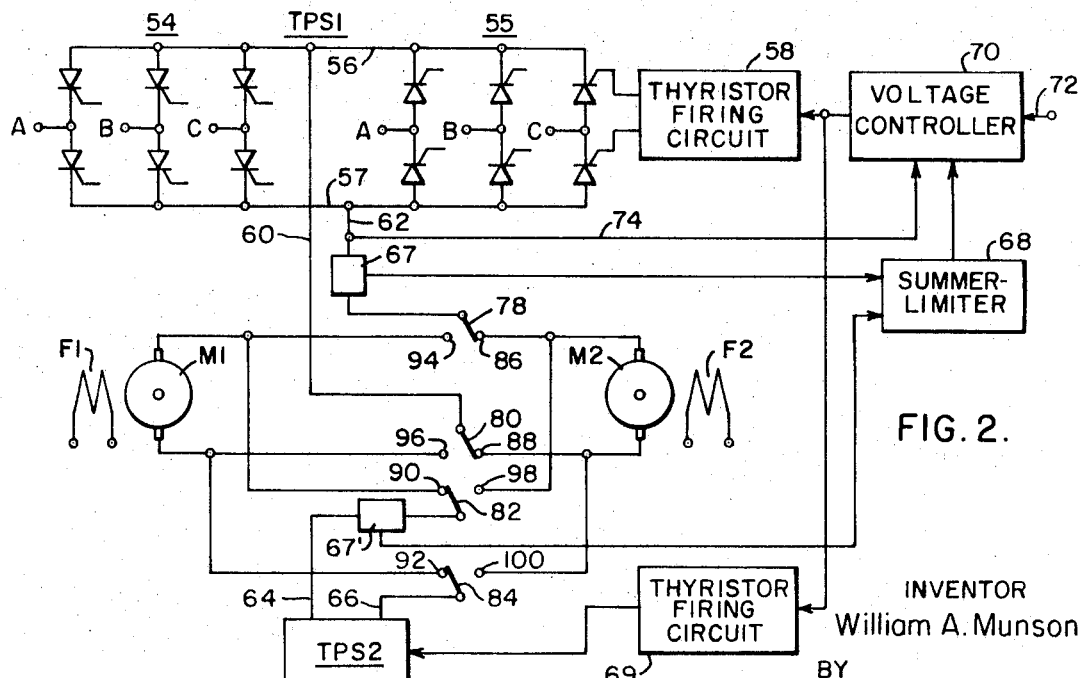
FIG. 2 is a schematic circuit illustration of the thyristor-powered dual motor system of the invention.

The present invention is shown in FIG. 2 and includes two thyristor power supplies TPS1 and TPS2 and two motors M1 and M2 with their associated field windings F1 and F2. Thyristor power supply TPS1 is shown in detail and includes a first series of unidirectional thyristor networks 54 and a second series of unidirectional thyristor networks 55. The series of networks 54 and 55 are connected across a pair of conductors 56 and 57 in oppositely poled relationships. Each network of the two series consists of two serially connected individual thyristors. The junctions between the thyristors in the respective networks are connected to the appropriate one of the three phases A, B and C of a conventional three-phase alternating current power supply. In accordance with usual practice, each thyristor is provided with a gate or control electrode, the control electrode of each thyristor being connected to a thyristor firing circuit 58, although only two control electrodes are shown connected in FIG. 2. The thyristors rectify an alternating current providing a variable rectified output responsive to the phase of a gating or firing signal applied to its control electrode, all in the well known manner. Firing circuit 58 is of a suitable conventional type which controls the phase of firings of the thyristor of series 54 and 55 to control the direct current output between conductors 56 and 57. Firing circuit 58 provides a symmetrically reversible control of voltage polarity as well as magnitude. The direct current output voltage from power supply TPS1, for example, appears across leads 60 and 62; while that from power supply TPS2 appears across leads 64 and 66.

Current sensors 67 and 67' are connected in lead 62 of power supply TPS1 and in lead 64 of power supply TPS2, respectively. The output of sensors 67 and 67' are voltage signals proportional to the current through the power supply output leads. Although physically located in the power supply output leads, the sensors are effectively sensing motor armature circuit current. One suitable form of current sensor is simply a resistance with the output voltage signal taken across its ends. The output of each sensor is applied to a summer-limiter 68 which sums the two voltage signals over a range bounded by a lower voltage limit and an upper voltage limit. These voltage limits correspond to desired lower and upper limits of armature currents.

The thyristor firing circuit 58, as well as thyristor firing circuit 69 for power supply TPS2, is controlled by a single conventional voltage controller 70. Controller 70 operates in the well known manner of an integrator used as an error mullification type feedback comparison circuit. Inputs to the voltage controller are a bipolar voltage reference signal input on lead 72 representing a motor speed and direction command, a first feedback voltage on lead 74 representing motor speed and a second feedback voltage input from the summer-limiter 68. The voltage reference signal to lead 72 is, for example, the signal which would program the start-stop, and speed levels of the hoist to enable the skip ear to properly tip over and right itself when at the top of the furnace. When the voltages do not cancel - i.e. Reference Voltage minus the feedback voltage and the Summer-Limiter Voltage - the error signal generated will be integrated by the voltage controller 70 causing the thyristor power supplies to increase their input until the maximum output voltage is obtained - all in accordance with well known principles.

By using the second feedback signal from summer-limiter 68, the output of the rectifiers will be controlled to a value which avoids torque spikes which might cause jerking of the cable 22.

Further, by use of the summer-limiter 68, together with its current sensing elements, 67 and 67', the individual armature current bus circuits are controlled simultaneously to substantially obtain equal load division between the motors through independent thyristor supplies, thereby controlling developed torque into the common driving gear 42. Thus, by controlling both motors simultaneously, the torque developed by each motor is controlled so that it will not overload the teeth of its associated pinion, 44 and 46, or the driving gear 42.

Switches 78, 80, 82 and 84 are provided to connect the motors M1 and M2 to the power supplies TPS1 and TPS2 in various configurations. It will be appreciated that these switches establish various armature current bus circuits as follows:

1. To operate motor M1 from power supply TPS2 and motor M2 from power supply TPS1, the switches 78, 80, 82 and 84 assume the positions shown in FIG. 2 wherein the switch blade of switch 78 engages contact 86, the switch blade of switch 80 engages contact 88, the switch blade of switch 82 engages contact 90 and the switch blade of switch 84 engages contact 92. Under these conditions the following arrangement of armature current bus circuits are developed: M1 with TPS2 and M2 with TPS1.

2. An alternate armature current bus circuits mode can be obtained by using M1 with TPS1 and M2 with TPS2. These armature current bus circuits are obtained by reversing the switches 78, 80, 82 and 84 of FIG. 2 resulting in the switch blade of switch 78 engaging contact 94, the switch blade of switch 80 engaging contact 96, the switch blade of switch 82 engaging contact 98 and the switch blade of switch 84 engaging contact 100.

3. A second alternate armature current bus circuit mode can be developed by using M2 with both thyristor power supplies, TPS1 and TPS2, in parallel. Under these conditions, the switches 78 and 80 will assume the positions shown in FIG. 2 while the switches 82 and 84 will assume the position opposite to that shown in FIG. 2. Under these conditions, the summer-limiter 75, will be recalibrated to operate for a lower current limit value for each thyristor supply less than that when using two motors, M1 and M2, but at a total value to the motor, M1, greater than when both motors are in service.

4. A third alternate armature current bus circuit mode can be developed by using motor M1 alone with both thyristor supplies, TPS1 and TPS2, in parallel. For this system, the switches 78 and 80 will assume the positions opposite to those shown in FIG. 2, whereas switches 82 and 84 will be as shown in FIG. 2. Again, as in 3, above, the individual thyristor power supplied, TPS1 and TPS2, will produce a lower maximum armature current value but the total current supplied to the motor, M2, will be higher than when using both motors, M1 and M2, and both thyristor supplies TPS1 and TPS2.

5. A fourth alternate current bus circuit mode can be developed to use both motors, M1 and M2, in series with one thyristor supply, TPS1. For this armature current bus circuit mode, the switches 78, 80, 82 and 84 of FIG. 2 will be connected to have the switch blade of switch 78 engaging contact 86, the switch blade of switch 80 engaging contact 96, the switch blade of switch 82 completely disengaged from either contacts 90 or 98, the switch blade of switch 84 disengaged from either contacts 92 or 100 and a jumper, not shown in FIG. 2, added to connect contact 90 to contact 100. Under these conditions, the armature current being supplied by thyristor supply TPS1 will flow through switch 78, through motor M2, from contact 100 to contact 90, through motor M1, through switch 80 and thence back to the thyristor supply TPS1. This armature current bus circuit will permit full torque to be developed by the two motors M1 and M2, but cause actual skip operating speed to be reduced to approximately one-half its value when using two supplies, TPS1 and TPS2, together with the two motors, M1 and M2, for either armature current bus circuits defined above in 1. or 2.

6. A fifth alternate armature current bus circuit mode can be obtained to use both motors, M1 and M2, in series with the other thyristor supply TPS2. For this armature current bus circuit the switches 78, 80, 82 and 84 of FIG. 2 will be connected to have the switch blade of switch 78 completely disengaged from contacts 86 and 94, the switch blade of switch 80 completely disengaged from contacts 88 and 96, the switch blade of switch 82 connected to contact 90, the switch blade of switch 84 connected to contact 100 and a jumper, not shown in FIG. 2, added to connect contact 86 to contact 96. Under this condition, the armature current being supplied by thyristor supply TPS2 would originate in lead 64, go through switch 82, through motor M1, from contact 96 to contact 86, thence through motor M2, and return to the thyristor supply, TPS2, via lead 66 and switch 84. As in 4. above, the armature current bus circuit would permit full torque to be developed by the motors, M1 and M2, while limiting the speed of the skips to approximately one-half that which would be obtained when using both motors, M1 and M2, and both thyristor supplies, TPS1 and TPS2.

An important feature of the invention is that it permits application of thyristor variable rectifiers, which are well known for their fast control response characteristics, to a dual motor drive system.

Also, the thyristor supplies may be directly tailored to the system's normal needs and do not have excessive capacity to enable handling any of the emergency conditions that can occur upon loss of either a drive motor or a drive supply. Accommodation of emergency needs with normal system capacity is obtainable by using the DC supply sources in the various armature current bus circuit modes described. This is done without suffering any reduction in furnace output due to limitations in the skip hoist power source. Special loading requirements may be similarly met.

Further, if one of the two thyristor power supplies should fail it can easily and rapidly be replaced in contrast to a motor-generator set.

While the present invention has been described with a certain degree of particularity, it should be understood that various modifications and changes thereof will be readily apparent and can be made within the scope and spirit of the present invention.

I claim:

1. A system for supplying electrical power to a pair of direct current motors drivingly connected to a common shaft, comprising a pair of reversible thyristor power supplies, first switch means for connecting either of said motors to either of said power supplies, second switch means for connecting both of said power supplies in parallel to either one of said motors, third switch means for connecting both of said motors in series to either one of said power supplies, a thyristor firing circuit for each of said power supplies, an error integrating voltage controller responsive to a bipolar reference signal for controlling both of said firing circuits, and means for applying voltage and current feedback signals from said motors to said error integrating voltage controller.

2. The system of claim 1 wherein said means for applying voltage and current feedback signals to said controller comprises a device for deriving a voltage feedback signal from at least one of said motors and for applying said voltage feedback signal to said voltage controller, means for deriving current feedback signals from both of said motors and for summing said current feedback signals to derive a current limit signal for said voltage controller, and means for applying said current limit signal to said voltage controller.

3. The system of claim 1 wherein said error integrating voltage controller includes voltage signal integrator means for integrating any differential between said reference signal and the summation of said voltage and current feedback signals.

4. The system of claim 1 wherein each of said thyristor power supplies comprises a pair of output conductors, first and second unidirectional rectifier units of the phase gated type connected across said conductors in mutually oppositely poled relationship, the thyristor firing circuit for each power supply acting to vary the polarity and magnitude of the output from said pair of output conductors in response to a change in the output of said voltage controller.

5. The system of claim 4 including a source of three-phase alternating current, said unidirectional rectifier units each being constructed and arranged to receive the three-phase components in three individual phase gated device networks, and means connecting said device networks to said thyristor firing circuit.

6. Apparatus in accordance with claim 5 wherein each of said device networks includes first and second thyristor devices connected in series across said pair of output conductors, the circuit junction point between the two thyristors of each network forming the input terminal for a three-phase component of the alternating current source.